(12) United States Patent
Powell et al.

(10) Patent No.: US 11,639,014 B2
(45) Date of Patent: May 2, 2023

(54) TWO-PHASE COOLING IN VASCULAR COMPOSITES USING A PUMPED FLUID LOOP

(71) Applicant: The Government of the United States of America, as represented by the Secretary of the Navy, Arlington, VA (US)

(72) Inventors: Brandon Powell, Washington, DC (US); John A. Montgomery, Washington, DC (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 311 days.

(21) Appl. No.: 16/709,700

(22) Filed: Dec. 10, 2019

(65) Prior Publication Data
US 2020/0180245 A1 Jun. 11, 2020

Related U.S. Application Data

(60) Provisional application No. 62/777,532, filed on Dec. 10, 2018.

(51) Int. Cl.
*B29C 35/16* (2006.01)
*B29C 70/30* (2006.01)
*B29L 31/30* (2006.01)

(52) U.S. Cl.
CPC ............ *B29C 35/16* (2013.01); *B29C 70/30* (2013.01); *B29C 2035/1616* (2013.01); *B29L 2031/3076* (2013.01)

(58) Field of Classification Search
CPC ...................................................... B29C 35/16
See application file for complete search history.

(56) References Cited

U.S. PATENT DOCUMENTS

2011/0001013 A1\* 1/2011 Torres Sepulveda .. B64G 1/506
244/171.8

OTHER PUBLICATIONS

Coppola, A, et al. "Survival of actively cooled microvascular polymer matrix composites uner sustained thermomechanical loading" Composites Part A: Applied Science and Manufacturing, vol. 82, Mar. 2016, pp. 170-179.\*
Chen, Weibo, et al. "A Robust Two-Phase Pumped Loop with Multiple Evaporators and Multiple Radiators for Spacecraft Applications." 47th International Conference on Environmental Systems, 2017.\*
Sunada, Eric, et al. "A two-phase mechanically pumped fluid loop for thermal control of deep space science missions." 46th International Conference on Environmental Systems, 2016.\*

\* cited by examiner

*Primary Examiner* — Jeffry H Aftergut
(74) *Attorney, Agent, or Firm* — US Naval Research Laboratory; Nigel Fontenot

(57) ABSTRACT

A method to improve thermal performance of vascular composites by using a two-phase working fluid for isothermalization includes the steps of: manufacturing a vascular composite structure optimized for a design point; manufacturing a thermal back end sized for the application; integrating the vascular composite into a fluid loop; and evacuating and filling the fluid loop with working fluid to an amount resulting in two-phase operation at the design point.

5 Claims, 7 Drawing Sheets

TWO-PHASE COOLING IN VASCULAR COMPOSITES USING A PUMPED FLUID LOOP

RELATED APPLICATIONS

This application claims the benefit of U.S. Provisional Application No. 62/777,532 filed Dec. 10, 2018, which is hereby incorporated herein by reference.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing NC 109425.

FIELD OF INVENTION

The present invention relates generally to composite aerospace structures, and more particularly to vascular composite structures using two-phase cooling.

BACKGROUND

Precision pointing structures represent a unique challenge in spacecraft design. To achieve a highly stable pointing platform, these structures are often fabricated from carbon fiber reinforced polymer (CFRP) composites, which exhibit excellent dimensional stability under varied thermal conditions. Despite the high dimensional stability, the poor heat conduction of CFRP composites can result in local thermal gradients that cause undesirable thermal distortions. This causes the reference frame of each individual component to be shifted relative to the other components, resulting in a lack of precision in pointing angle and therefore a degradation of pointing stability. Maintaining a constant temperature throughout the optical pointing structure (isothermalizing) would mitigate the thermal distortions induced in the structure and improve pointing stability.

SUMMARY OF INVENTION

Therefore, presented is a method to integrate a vascular network into composite aerospace structures along with a closed-loop fluid network containing a liquid refrigerant held at (or slightly below) its saturation temperature. As heat is applied to the structure, the refrigerant will begin the phase change and become a two-phase flow. By using the inherent two-phase capability of fluid (latent heat of vaporization), the flow can remain isothermal as heat is applied. Circulating this two-phase fluid throughout the vascular network will actively isothermalize the composite structure while also adding the capability to move significant amounts of heat from components mounted to it.

According to one aspect of the invention, a method to improve thermal performance of vascular composites by using a two-phase working fluid for isothermalization, the method comprising the steps of: manufacturing a vascular composite structure optimized for a design point; manufacturing a thermal back end sized for the application; integrating the vascular composite into a fluid loop; and evacuating and filling the fluid loop with working fluid to an amount resulting in two-phase operation at the design point.

Optionally, the step of manufacturing the vascular composite includes the steps of: laying up lower plies on a tool; placing a sacrificial material shaped to a desired network geometry on the lower plies; laying up upper plies on top of the lower plies and network geometry, thereby forming an assembly; curing the assembly; and after the assembly is cured, removing the sacrificial material.

Optionally, the method includes the step of pre-curing a film adhesive around the sacrificial material to hold the sacrificial material in place during the curing step.

Optionally, the step of manufacturing the vascular composite includes the steps of: laying up upper plies on a first tool having desired network geometry; laying up lower plies on a second tool having final part geometry; gluing together the upper and lower plies using either a wet layup or a film adhesive.

Optionally, the thermal back end includes a pump, and a heat exchanger.

The foregoing and other features of the invention are hereinafter described in greater detail with reference to the accompanying drawings.

DETAILED DESCRIPTION

Precision optical pointing structures represent a unique challenge in spacecraft design. To achieve a highly stable pointing platform, these structures are often fabricated from carbon fiber reinforced polymer (CFRP) composites. CFRP composites exhibit excellent dimensional stability under varied thermal conditions; however, they can also exhibit poor thermal conductivity, specifically in the out-of-plane direction.

Figure 1:
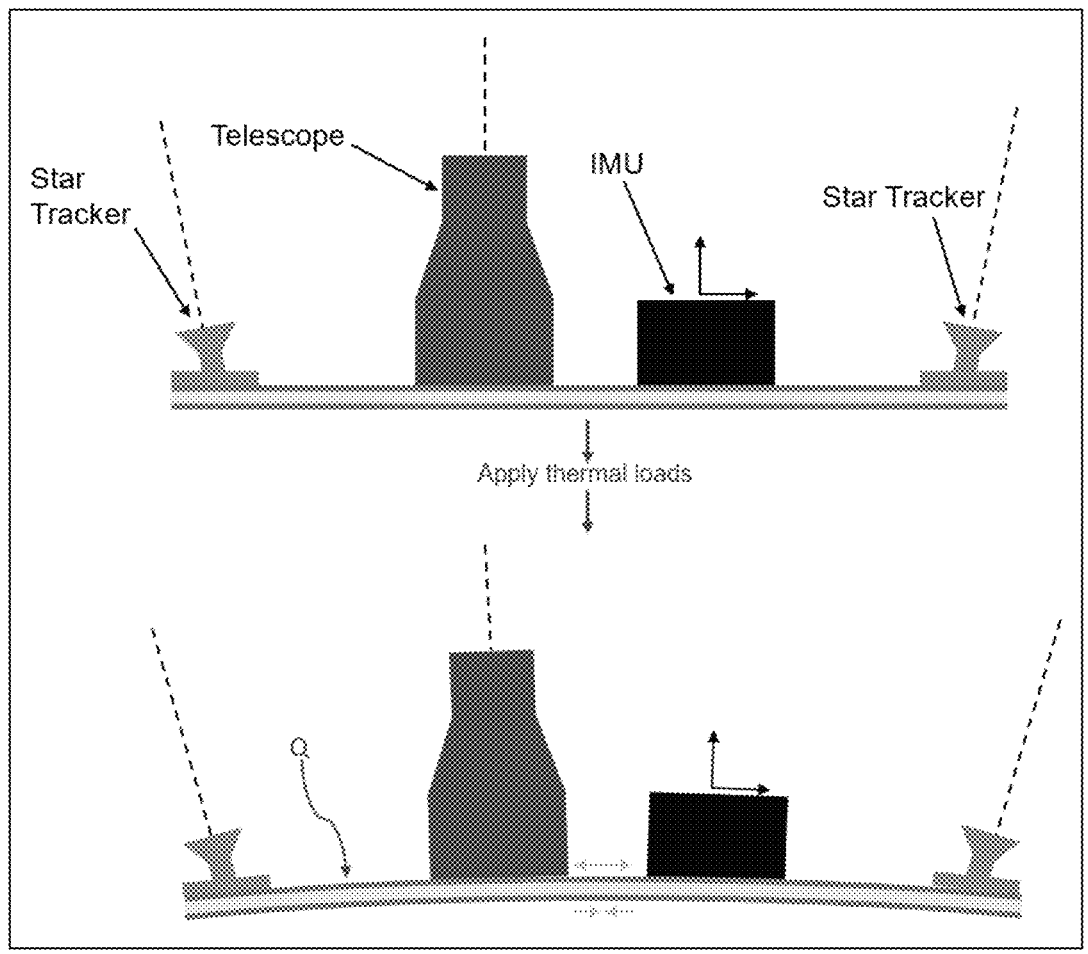
FIG. 1 shows a schematic space structure undergoing thermal warping.

Despite the low coefficient of thermal expansion (CTE), the poor heat conduction of CFRP composites can result in local thermal gradients that cause undesirable thermal distortions. Additionally, both global and local heat fluxes exacerbate the problem, as the structure must be designed to handle large global heat loads from solar radiation as well as large local heat fluxes from power-dissipating components (e.g. optical telescopes, pointing mechanisms, inertial measurement units (IMUs), etc.). A 2-D representation of this thermal distortion is shown in FIG. 1.

As the structure deforms while moving through space, the reference frame of each individual component is shifted relative to the other components, resulting in a lack of precision in pointing angle and therefore a degradation of pointing stability. Maintaining a constant temperature throughout the optical pointing structure (isothermalizing) would mitigate the thermal distortions induced in the structure and improve pointing stability.

Figure 2:
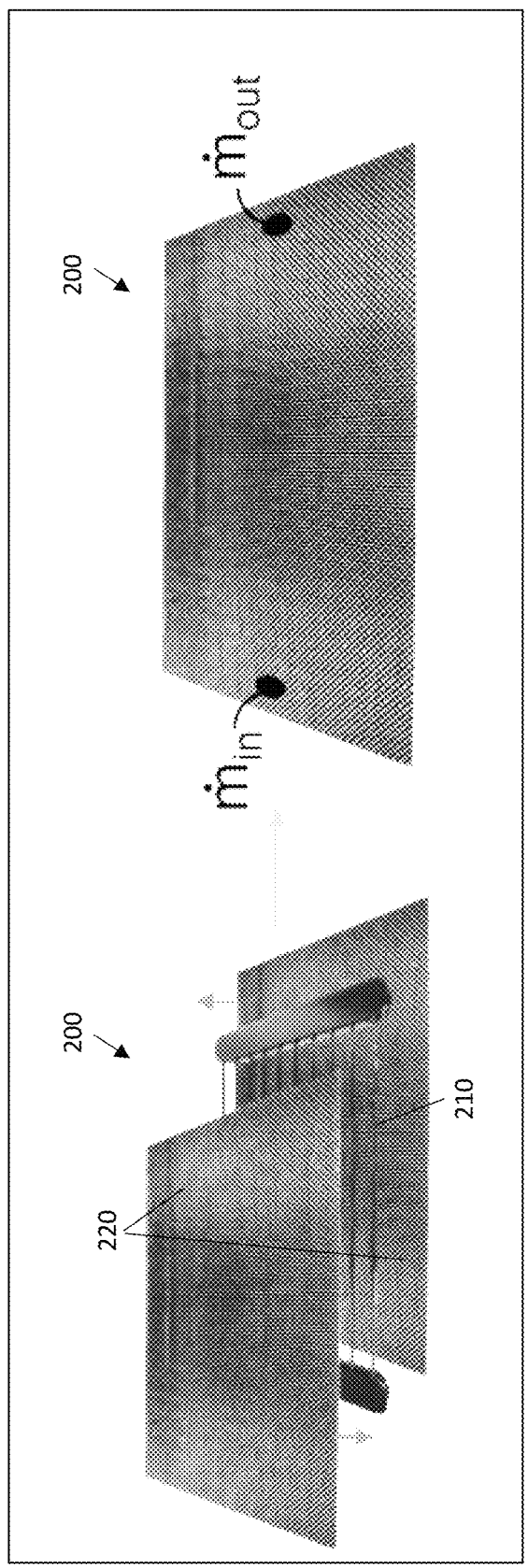
FIG. 2 shows a simplified exemplary composite structure.
Figure 3:
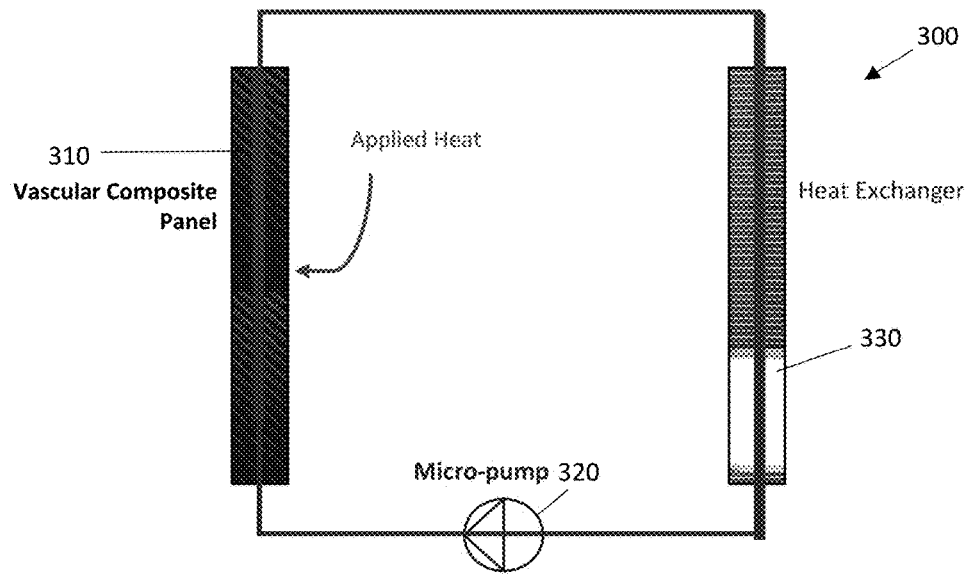
FIG. 3 shows a simplified schematic of an exemplary system.

Composite aerospace structures with integrated vascular systems will become part of a closed-loop fluid network containing a liquid refrigerant held at (or s lightly below) its saturation temperature. As heat is applied to the structure, the refrigerant will begin the phase change and become a two-phase flow. By using the inherent two-phase capability of 0uid (latent heat of vaporization), the flow can remain isothermal as heat is applied. Circulating this two-phase fluid throughout the vascular network will actively isothermalize the composite structure while also adding the capability to move significant amounts of heat from components mounted to it. This basic concept of a composite structure 200 with an integrated vascular system 210 sandwiched between layers of composite material 220 is shown in FIG. 2, and a basic pumped loop system 300 with an integrated vascular composite 310 is shown in FIG. 3. The loop would include a thermal backend having appropriately sized components including a pump 320 and heat exchanger 330.

While isothermalizing optical structures on spacecraft is a critical need, there are several other applications that would benefit from this technology.

A primary limitation in computing power is thermal management. K-core plates, manufactured by Thermacore, are the state-of-the-art technology and rely on heat pipes to maintain the temperature of computer components. The inherent issue with this technology is while it does spread the thermal energy to maintain more manageable local temperatures, it does not actively remove the heat from the system. By replacing a K-core plate with a vascular composite in a pumped loop, significant improvements could be seen in thermal management of computer components.

Any technology that uses batteries also has thermal limitations, from cell phones to electric cars to battery banks in submarines. Batteries can get obtrusively hot during extreme operating conditions, and have the potential to fail in a catastrophic manner known as "thermal runaway" (8-1 OJ. By using a vascular composite structure to encase the batteries, large heat loads can be mitigated by using a pumped coolant loop while minimizing the weight added to the system. Additionally, having each battery in a cooled structure would remove the concern of thermal runaway by thermally isolating each battery cell.

Flight decks are historically made of steel with a non-slip coating, both of which can become structurally compromised when large heat loads are applied by a landing vehicle. Vertical take-off and landing (VTOL) vehicles, such as the F-35 and V-22 Osprey, have both been known to melt the decks during take-off and landing, causing permanent distortion. By integrating a vascular network into the structure, this large heat flux could be controlled to prevent melting of the decks. The majority of the work to date could be easily transferred to a metallic structure instead of a CFRP, which would allow this technology to function at the temperatures required.

A primary difficulty in the hypersonics field is thermal mitigation. Several works have been published from NCST pertaining to leading edge cooling of hypersonic vehicles, many of which involve inducing a phase change of the refrigerant. There are several composite materials that are capable of operating in temperatures (2000+ ° F.) required for hypersonic applications. Several Carbon-Carbon (C—C), Carbon-Silicon Carbide (C—SiC), and ceramic matrix (CMC) composites can be operated at temperatures exceeding 2000° F.

Several key technical fields are being leveraged to create vascular composite aerospace structures. The first of which is the current methods for spacecraft thermal mitigation. Conventionally, heat pipes have been used to maintain operating temperatures for spacecraft components. While both passive heat pipes and actively pumped heat pipe loops move heat away from a point source at a high rate, they are ineffective in reducing thermal distortions as the heat pipes are a metallic structure with a high CTE.

Computer cooling is also at the state of the art of maintaining low temperatures in computer components. The current method for this is to use ACT Hi-K or Thermacore K-core plates. These plates use integrated heat pipes to increase the effective thermal conductivity of the material, but are made of Aluminum. As a result, they have an incredibly high CTE and suffer from large thermal distortions.

Focusing on the structural concerns of vascular composite structures, containing the refrigerant in a composite structure without any leakage is critical. Liner-less composite tanks have been at the forefront of space-based structural research, as they provide significant weight savings compared to their metallic-lined counterparts. The difficulty plaguing the field has been two-fold: manufacturing methods, and diffusion of the gas through the composite structure. The manufacturing and analytical techniques used to yield a low-outgassing structure with minimal refrigerant diffusion are critical. In an optical aerospace structure, outgassing and/or leaking refrigerant would be severely detrimental to the mission.

Figure 4:
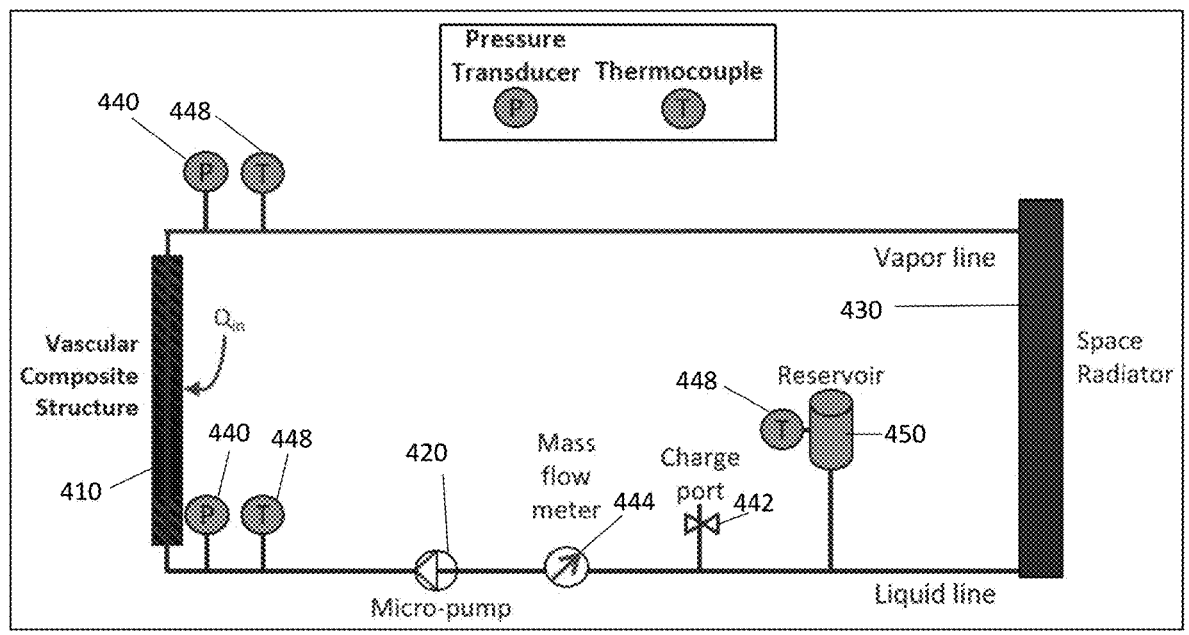
FIG. 4 shows a schematic of an exemplary system.

Referring now to FIG. 4, an exemplary system 400 includes a micro-pump 420, a vascular composite structure 410, and space radiator 430 to function as a condenser. The result is a pumped loop with a liquid-to-vapor phase change occurring in the vascular composite structure, and a vapor-to-liquid phase change occurring in the space radiator. Additionally, there may be two pressure transducers 440, a charge port 442, a mass flow meter 444, and a pressure relief valve (not shown). Three thermocouples 448 may also be used, with one thermocouple 448 on each pressure transducer 440 and one on the fluid reservoir 450. By knowing the pressure and temperature of the refrigerant at the inlet and the outlet of the vascular composite structure, the vapor quality of the refrigerant can be calculated and used in a control loop to manage power to the micro-pump.

The main design driver for an optical aerospace structure is the pointing requirement, measured on the order of microradians. This is the largest permissible distortion allowable before the ground truth of the spacecraft is beyond an acceptable limit. From this requirement, the allowable thermal distortions can be calculated based on a finite element model (FEM) of the geometry. The result of this calculation will be a range of temperatures that cannot be exceeded without failing the distortion requirement. Next, the thermal environment will be analyzed to determine the total heat input, as well as a surface map of the heat fluxes. This heat flux map, along with the maximum and minimum temperature requirement, will result in a maximum allowable pressure drop (10 satisfy the thermal gradient requirement along the channels) as well as a vascular network map (to satisfy the thermal gradient requirement between the channels). Additionally, the structure should be low-outgassing (per the ASTM E595 outgassing test, CVC<0.1% & TM<1%), the structural penalty imparted by the vascular network should be minimized, and the size, weight, and power (SWaP) implications should be minimized.

Figure 5:
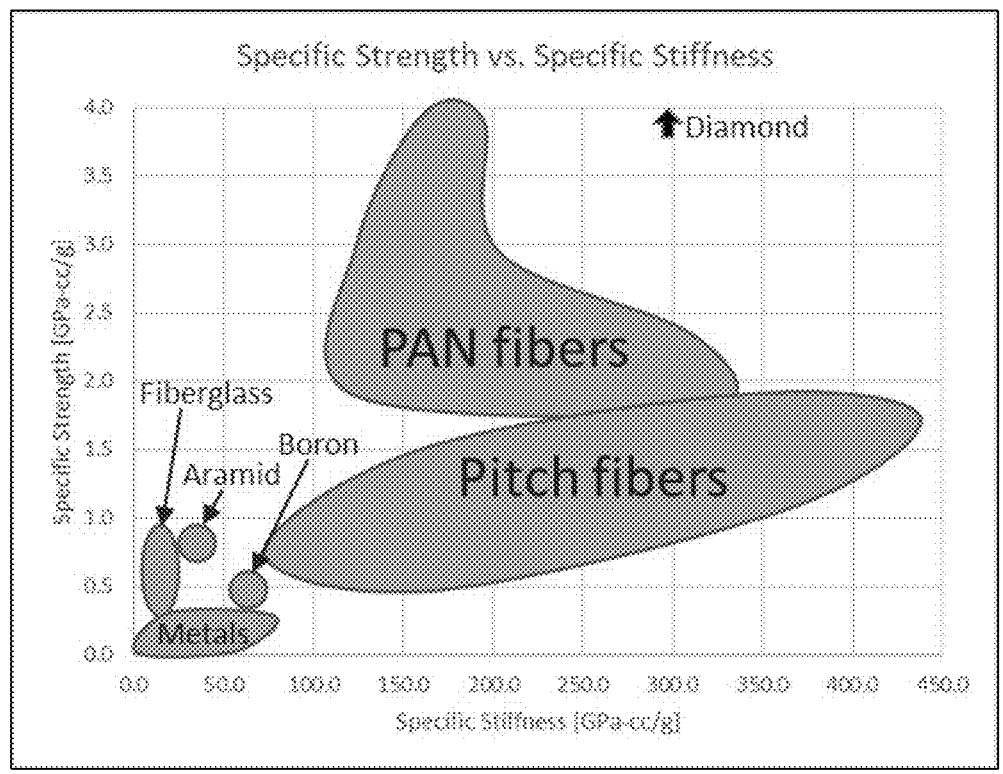
FIG. 5 shows a simplified diagram of composite material specific strength versus specific stiffness.

An important consideration in exemplary systems are material choices, as there are effectively an infinite number of material combinations to result in a CFRP. While there are dozens of commercially available carbon fibers, they can all be classified as either PAN-based or pitch-based. PAN-based carbon fibers are created by carbonizing Polyacrylonitrile (PAN), a synthetic thermoplastic resin. Similarly, pitch-based carbon fibers are created by carbonizing pitch, a viscoelastic material typically derived from crude oil. Both processes ultimately result in a carbon fiber, but the resulting material properties of the fibers differ. A generic plot showing the difference in behavior of PAN vs. pitch-based fibers is shown in FIG. 5.

In general, PAN-fibers are nearly twice as strong as their pitch-based counterparts but only half as stiff and only have one-sixth the thermal conductivity. PAN-based fibers are significantly cheaper than pitch-based fibers, and as a result have approximately 90% of today's market share of carbon fibers so they are more readily available.

Another important consideration is to determine what type of weave pattern to use in the structure. There are several types of carbon fiber weaves commercially available, each with its own strengths and weaknesses. A comparison of weaved carbon fiber to unidirectional carbon fiber is laid out in Table 1.

TABLE 1

Carbon Fiber Weave Comparison

| Woven | Unidirectional (unitape, UDPP) |
|---|---|
| Several weaves available (plain, 4-8 harness, etc.) | All fibers orient in a single direction, hard to handle |
| Tight knit weaves (plain weave) are easy to handle, hard to form, and weaker | |
| Looser weaves (8 harness) are strong and easy to form, but fall apart easily | |
| Only PAN-based fibers available in a woven form | Can be made from PAN- or Pitch-based fibers |
| High stiffness prevents Pitch-based fibers from being woven | |
| More prone to leaking [ref] | Generally seal well with 4+ plies [ref] |
| Space between weaves provide a leak path | |
| Relatively thick individual plies Typically 0.008-0.012 in | Relatively thin individual plies Typically 0.003-0.006 in |
| Lower effective thermal conductivity & stiffness | Higher effective thermal conductivity & stiffness |

Ultimately, the combination of what fiber and what weave to use will be application-specific. For example, a flat plate with very critical dimensional requirements would likely use a pitch-based fiber in a unidirectional prepreg (UDPP). In contrast, an object with complex curvatures, sharp corners, and a relatively low thermal gradient requirement would likely be made using a PAN-based fiber in a 5 harness-satin weave.

Figure 6:
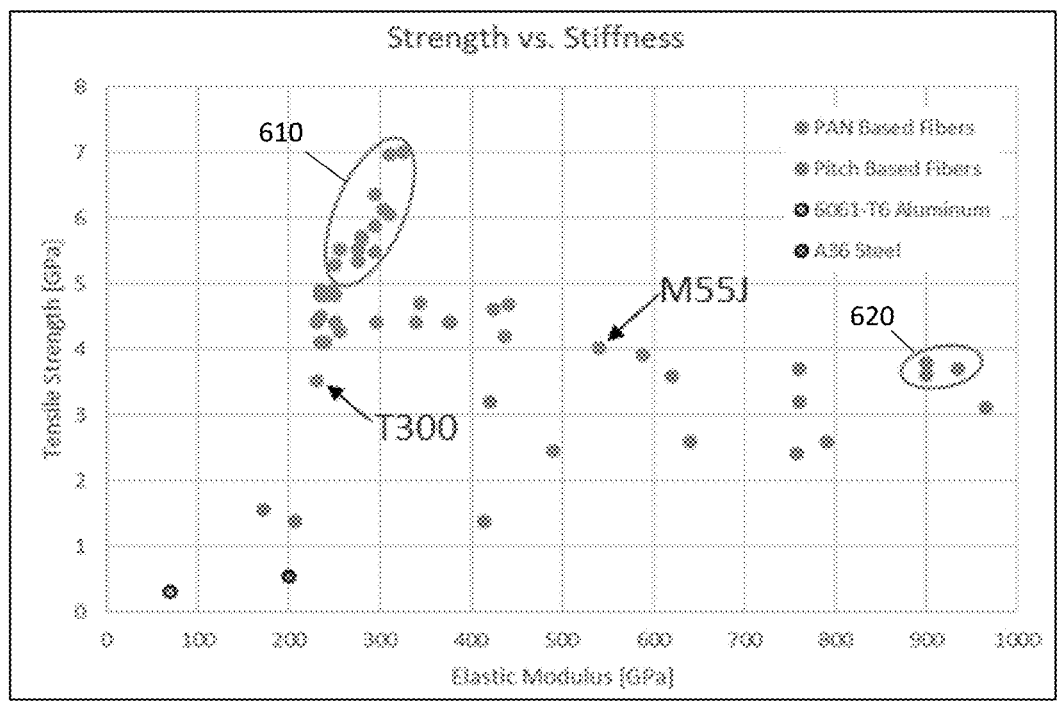
FIG. 6 shows diagram of composite material strength versus stiffness.

The most popular commercially available fibers are recorded along with their associated material properties, and their strengths and stiffness's in FIG. 6.

The most inexpensive and readily available carbon fiber on the market is T300. At a fraction of the cost of most other carbon fibers, T300 has a poor tensile strength and is very compliant. For applications where strength and stiffness is less critical than cost, such as automotive applications, this fiber may be a good selection. In the aerospace industry, where performance often dominates price in the design process, M55J is the most popular fiber. With good strength (nearly identically the average of all carbon fibers studied), stiffness (30% above the average), and thermal conductivity (20% above the average), it is the most budget-friendly choice for applications where strength, stiffness, and thermal performance are all critical.

These two fibers are commonly used as they represent a compromise of strength, stiffness, and thermal conductivity. There are, however, certain fibers with key characteristics. Fibers 610 (T800/1000G, IM5-10, MR60H/70, TRH50, and 37-800) are designed specifically with strength in mind. They have approximately 40% higher strength, but 30% lower stiffness and 82% lower thermal conductivity than the average carbon fiber. For structural applications where weight is a primary concern, these fibers are ideal. In contrast, fibers 620 (K13D2U, K13C2U, and K13C6U) are good for applications that prioritize stiffness and thermal conductivity over strength. These fibers have 130% higher stiffness and over 500% higher thermal conductivity, but 15% lower strength compared to the average fiber.

For an optical aerospace structure, maintaining dimensional stability under any thermal loading that may be imparted on the structure is critical. Strength is not as high of a concern, as the structure will be space-based and should have low operational loads. As a result, a structure that is primarily comprised of a pitch-based fiber would be optimal. The improved stiffness and thermal conductivity would result in improved dimensional stability and reduced thermal gradients. This, in turn, would allow for the vascular network to have larger spacing between channels, resulting in a less complex network geometry and less SWaP impact.

Another important consideration is the impact of the network geometry on the manufacturing of the panel, specifically the potential of breaking fibers during the layup and cure. During the manufacturing process, the fibers in each ply in contact with the network will be identically the shape of the top of the channels, as shown in FIG. 7.

Figure 7:
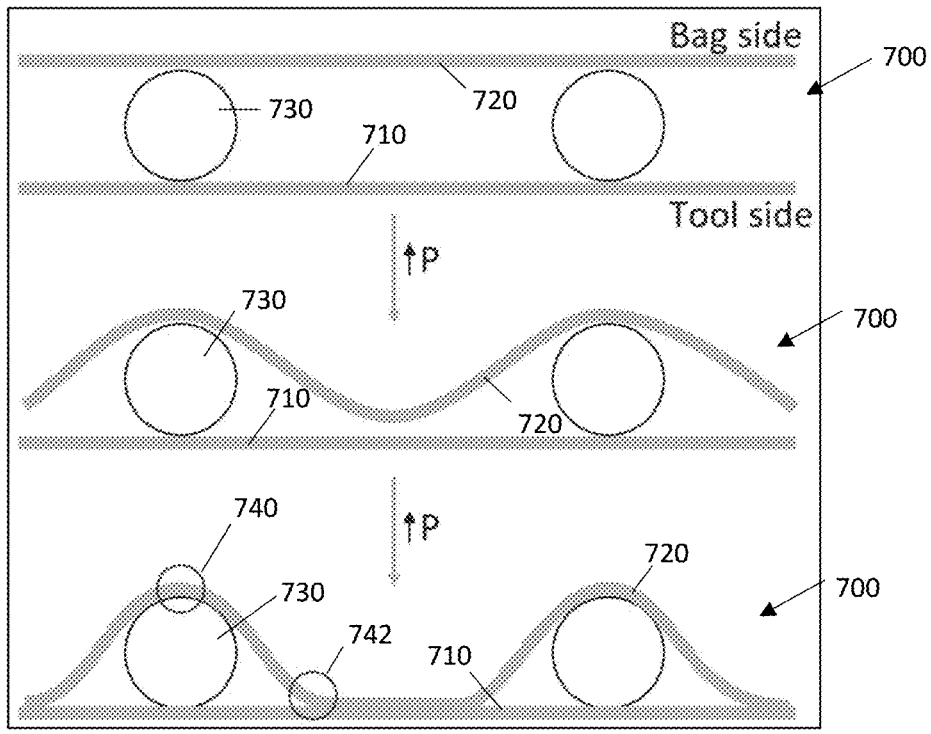
FIG. 7 shows a simplified exemplary method of making an exemplary composite structure.

The upper image in FIG. 7 shows a notional view of the layup 700, in which lower 710 and upper 720 plies are laid up on the tool side and bag side, respectively, with the network geometry 730 inserted in between. As vacuum pressure is applied to the layup (shown in the figure as an increase in P, with the second and third images down having increasing vacuum pressure), the upper plies 720 begin to conform to the network geometry 730. The areas of concern 740, 742 could have fiber breakage due to a very small radius of curvature in the conforming fibers. The first area of concern 740, directly above the network, will have a radius of curvature identical to the radius of the network geometry 730, as they will be pressed together by the bag pressure and cured in position. By combining governing equations (1) and (2), a minimum radius of curvature (3) can be calculated for any fiber, given an elastic modulus (E), ultimate tensile strength ($\sigma_{all}$), and a thickness (t).

$$\sigma = \frac{M\left(\frac{t}{2}\right)}{I} \quad (1)$$

$$\rho = \frac{EI}{M} \quad (2)$$

$$\rho_{min} = \frac{E \times t}{2\sigma_{all}} \quad (3)$$

Figure 8:
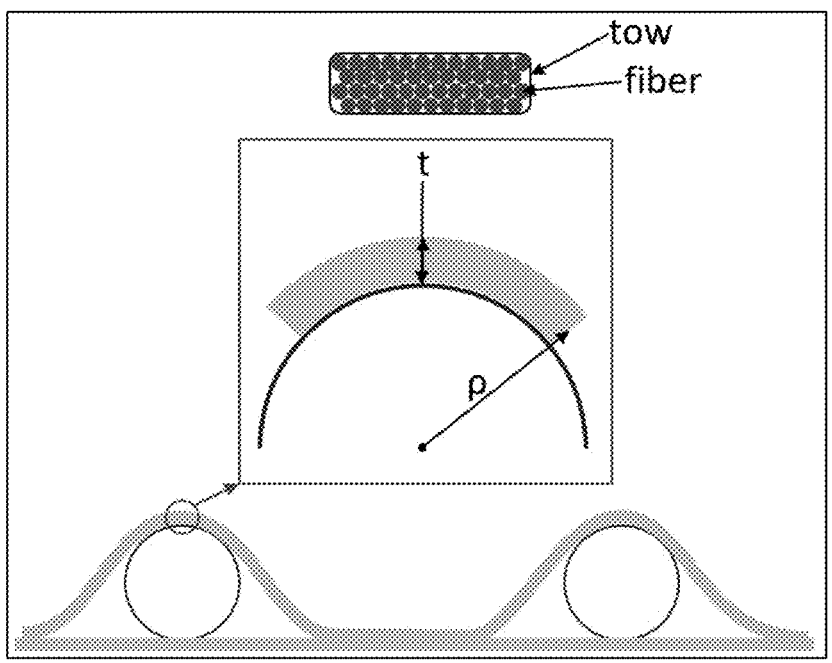
FIG. 8 shows a schematic diagram illustrating composite thickness.

The thickness could be conservatively assumed to be the height of a tow of fibers, or liberally assumed to be the diameter of a fiber. This phenomenon is shown in FIG. 8.

In reality, the effective thickness will fall somewhere in between; the conservative estimate assumes the entire tow acts as one and the liberal estimate assumes each fiber acts individually, but in reality there will be slip among the fibers in a tow with a non-zero frictional force.

A basic test was performed by winding a M55J, AS4, and K13D2U fiber around small rods to determine the actual bend radius where fiber breaking was visually observed, and the result was a realistic approximation for the actual minimum bend radius (4) based on the liberal and conservative estimates.

$$r_{min} \approx r_{lib} + 0.22 \times (r_{cons} - r_{lib}) \quad (4)$$

It should be noted that the realistic approximation (4) falls between the liberal and conservative estimates, as it is inherently bound by the extreme limitations of the two.

The high strength fibers can be in contact with very small network geometries without concern of fiber breakage. In reality, network diameters below 0.009 in are likely too small to consistently manufacture and would result in impractically high pressure drop. As a result, channels will likely be larger than this and breaking these high-strength fibers during manufacturing is therefore not a risk.

The concerning result of this study, however, is that the K13-series fibers cannot tolerate any network channel diameters smaller than 0.092 in without the potential for fiber breakage. There are several ways to mitigate this, such as using high strength fibers in the inner plies of the structure in contact with the network, but this finding shows that there are certain fibers and network geometries that cannot be paired together without the potential of fiber breakage. This should be avoided, as fiber breakage will result in degraded strength, stiffness, and thermal conductivity of the resulting structure.

There are several materials that are used as a matrix in composite structures. The most common are:
1. Polyester
2. Epoxy
3. Phenolic
4. Cyanate Ester
5. Polyimide
6. BMI (Bismaleimide).

Polyester is very cheap, but overall has the worst properties of all matrix materials. As a result, polyester is typically reserved to hobby work and visual structures only. Epoxy is the next most common material, and is commonly used in the automotive and aerospace industry due to a relatively low cost for a large performance increase over polyester. Phenolic, similar to polyester, has poor properties compared to other matrix materials. That being said, it is commonly used in thermal management environments due to its impressive ablative characteristics. While it does not have a high service temperature, it can ablate away to protect the underlying structure in a repeatable and consistent manner. Cyanate ester is used almost exclusively in spacecraft applications. As the only common matrix material specifically designed to have low outgassing, it can easily meet all NASA outgassing requirements without special additives that degrade the overall performance. Polyimide and BMI are similar in performance and used for high service temperature applications. Both of these materials are prohibitively expensive, and are only used if operation temperature cannot be reduced to allow for either epoxy or cyanate ester to be used.

It should be noted that while these are the typical matrix materials for a CFRP, there are several other options that are less commonly used as well as other non-polymers that can be used to make a composite that is not a CFRP. For example, a C—C composite ultimately results in a carbon fiber reinforced composite with a graphite matrix, which allows for service temperatures of over 3000° F. Ceramic matrices are also useable for extremely high service temperature applications. Some metallic matrices may be possible to result in a carbon fiber reinforced metallic structure.

In order to sweep through several parameters quickly in order to design a vascular composite structure, reduced order models are preferred so a full 3D structural model is not required at every design stage. First, a 3D model is generated to represent the geometry of a vascular composite network and the surrounding structure.

During manufacturing, a matrix pocket is generated (either intentionally or due to excess matrix) surrounding the network geometry. As a result, there are three materials that need to be accounted for in the model: the upper plies, lower plies, and residual matrix, each of which can have a different material property.

Equation (5) below, where Q is the heat flux, t is the wall thickness, and K is the thermal conductivity, describes change in temperature.

$$dT = Q \times \frac{t}{K} \quad (5)$$

Directly above the channel, the out of plane temperature difference (dT) should be in a form similar to this. Between the channels, however, there will be a temperature increase as the total conduction distance increases between the channel wall and the point of interest. As a result, the temperature between the channels should be the upper surface temperature of the channel plus a function of channel spacing and in-plane thermal conductivity. Knowing this results in equation (6) below.

$$dT = Q_{in}\left(\frac{t_{ply}N_{plies}}{2K_g} + A\frac{S_c}{k_{x,y}}\right) \quad (6)$$

Where $t_{ply}$ is the individual ply thickness, $N_{plies}$ is the number of plies, $K_z$ is the out-of-plane thermal conductivity, $S_c$ is the channel spacing, and $k_{x,y}$ is the in-plane thermal conductivity. This equation, where A is left to be a linear function of $S_c$. Using a simple two-parameter sweep to converge on an optimal equation for A results in (7):

$$A = 1 + 2.6475 \ast S_c \quad (7)$$

The combination of (6) and (7) yield an ideal reduced-order mathematical representation of the thermal gradient between two channels.

These equations allow for a fast and efficient preliminary network design to result in a system-appropriate thermal gradient. It can also be used to create a family-of-curve plot for a system (assuming some parameters can be kept fixed) to allow a designer to find a correlation between two parameters.

Equations (6) and (7) are used to determine the maximum allowable channel spacing to result in a thermal gradient to meet the system requirements. Knowing the maximum spacing allowable for the system, the designer can begin to lay out and optimize the system. This process is shown in FIG. 9.

Figure 9:
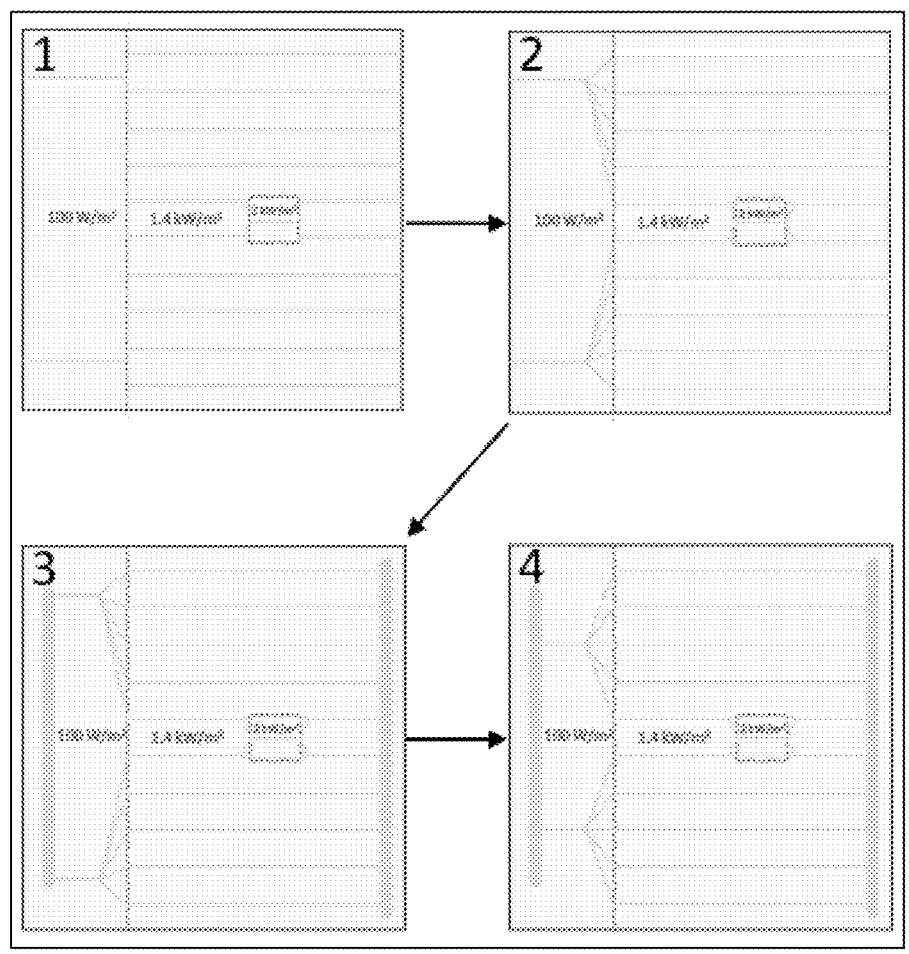
FIG. 9 shows a simplified exemplary method for designing an exemplary composite.

As can be seen in FIG. 9, the design process consists of connecting each segment of the network (1-2), generating manifolds and/or branching areas (2-3), and optimizing the path (3-4).

In two-phase fluid flow, pressure is directly related to the temperature. Heat applied to the fluid is dissipated through the latent heat of vaporization without changing the bulk fluid temperature. If the flow rate and heat load are properly balanced in a pumped loop system, the flow exiting the evaporator (a vascular composite structure with applied heat loads) will have a vapor quality of between 0 and 1.

Since the entire process is designed to operate within this two-phase regime, the temperature along the fluid flow is identically the saturation temperature at the pressure at any point along the flow. If the pressure is reduced along the length of a channel (pressure drop), the temperature of the fluid will drop correspondingly.

There are two primary methods with which the vascular network can be generated; a removable tool, or a non-removable tool. A removable tool will be completely enclosed into the layup during the cure, and removed by either dissolving or evaporating the tool. A non-removable tool, in contrast, will be used to generate a deformation in half of the composite structure (individually cured). After the half of the structure has been cured, it will be glued to another composite structure and result in a vascular network between the two halves. The removable and non-removable tool manufacturing methods are shown in FIGS. 10 and 11, respectively.

Figure 10:
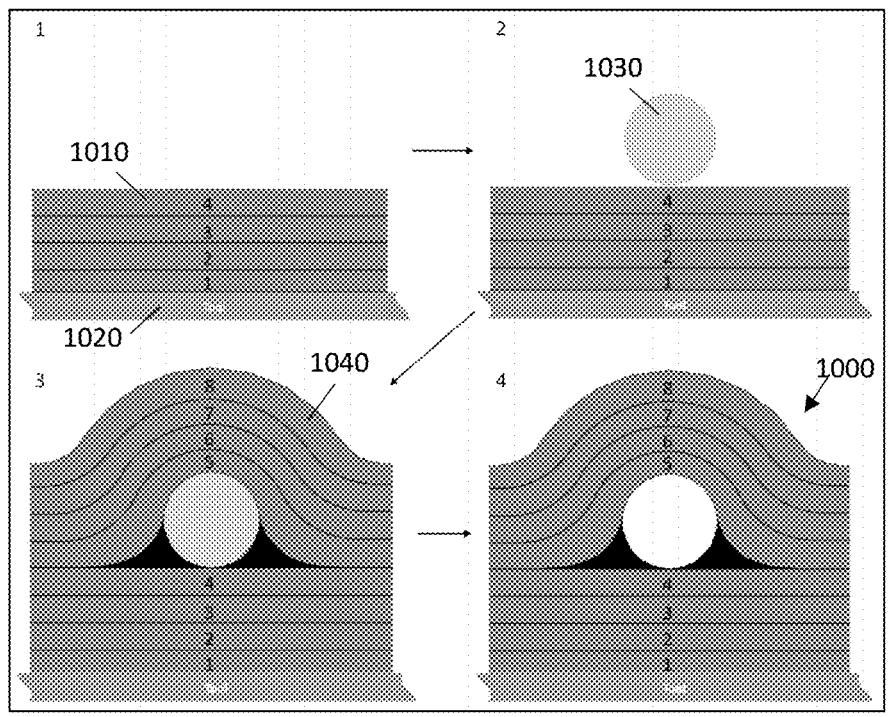
FIG. 10 shows a simplified exemplary method of making an exemplary composite structure using a sacrificial material.

In FIG. 10, the lower plies 1010 are laid up on the tool 1020 used for manufacturing the part. The network geometry 1030, made of a sacrificial material, is then placed on the lower plies 1010. The upper plies 1040 are laid up on top of the lower plies 1010 and network geometry 1030, and the part is cured. Then, after the part is fully cured, the network geometry 1030 is removed via dissolving, evaporation, or any other method to result in a composite 1000 with an embedded network. However, the sacrificial material used to create the vascular network may melt during the part cure, resulting in a deformed network geometry cross-section. Optionally, then, pre-curing a film adhesive around the sacrificial material may be used to prevent this problem by holding the melted structure in place during autoclave cure and isolate it from contaminating any bond faces.

Figure 11:
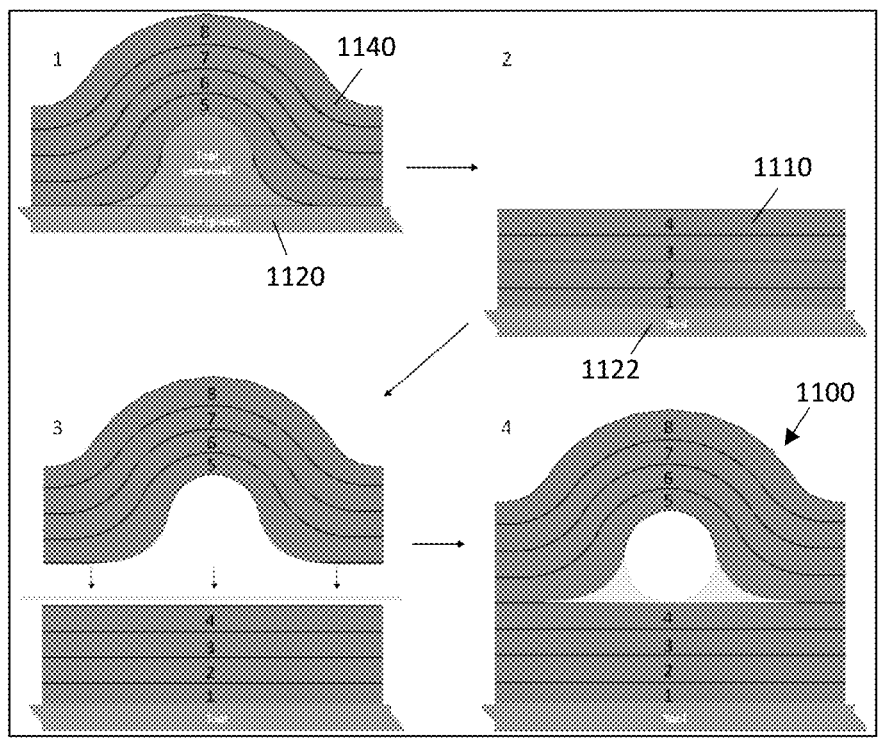
FIG. 11 shows a simplified exemplary method of making an exemplary composite structure without using a sacrificial material

In FIG. 11, the upper plies 1140 are first laid up on a tool 1120 that contains the network geometry 1130. The lower plies 1110 are then laid up on a separate tool 1122 with the final part geometry. The upper 1140 and lower 1110 plies are then glued together using either a wet layup or a film adhesive, and the result will be a composite 1100 with an integrated network. Both methods are valid from a manufacturing standpoint, and both have various benefits and downsides. For example, certain materials that degrade at the temperatures needed for removing sacrificial material would require a non-removable tool for manufacturing.

Additionally, there are several methods to making the sacrificial vascular network pattern. Due to the flexibility, cost, and time to manufacture the geometry, additive manufacturing using a Fused Deposition Manufacturing (FDM) extrusion machine (e.g., Ultimaker 3+) has been used. This method is capable of producing geometries as small as 0.015" in diameter. While it can print these small channels, its limited resolution can have a noticeable impact on the surface quality of small network geometries which could affect pressure drop along the network. For fielded systems, it is likely that another manufacturing technique (casting, machining, etc.) would be used to produce smoother and more repeatable geometries at the expense of cost.

Optionally, in order to reduce failure points, any manifolds in exemplary systems may be wrapped with a fiber tow. Alternatively, some exemplary systems remove manifolds entirely, using a purely branched network instead.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method to improve thermal performance of vascular composites by using a two-phase working fluid for isothermalization, the method comprising the steps of:
manufacturing a vascular composite structure optimized for a design point, the manufacturing comprising
laying up lower plies on a tool;
pre-curing an adhesive film around a sacrificial material to hold the sacrificial material in place during curing;
placing the sacrificial material with the pre-cred adhesive film shaped to a desired network geometry on the lower plies;
laying up upper plies on top of the lower plies and network geometry, thereby forming an assembly;
curing the assembly;
after the assembly is cured, removing the sacrificial material;
manufacturing a thermal back end;
integrating the vascular composite and the thermal back end into a fluid loop; and
evacuating and filling the fluid loop with working fluid to an amount resulting in two-phase operation at the design point to maintain a constant temperature throughout the vascular composite structure to mitigate thermal distortions induced in the vascular composite structure, the working fluid being held around its saturation temperature, the thermal back end receiving the working fluid from the vascular composite structure for heat transfer.

2. The method of claim 1, where the step of manufacturing the vascular composite includes the steps of:
laying up upper plies on a first tool having desired network geometry;
laying up lower plies on a second tool having final part geometry;
gluing together the upper and lower plies using either a wet layup or a film adhesive.

3. The method of claim 1, wherein the thermal back end includes a pump, and a heat exchanger.

4. A method to improve thermal performance of vascular composites by using a two-phase working fluid for isothermalization, the method comprising the steps of:
- manufacturing a vascular composite structure optimized for a design point, the manufacturing comprising
  - laying up lower plies on a tool;
  - pre-curing an adhesive film around a sacrificial meterial to hold the sacrificial material in place during curing;
  - placing the sacrificial material with the pre-cured adhesive film shaped to a desired network geometry on the lower plies;
  - laying up upper plies on top of the lower plies and network geometry, thereby forming an assembly;
  - curing the assembly; and
  - after the assembly is cured, removing the sacrificial material;
- manufacturing a thermal back end;
- integrating the vascular composite and the thermal back end into a fluid loop; and
- evacuating and filling the fluid loop with working fluid to an amount resulting in two-phase operation at the design point, the thermal back end receiving the working fluid from the vascular composite structure for heat transfer.

5. The method of claim 4, wherein the thermal back end includes a pump and a heat exchanger.

* * * * *